(12) United States Patent
Dorchy et al.

(10) Patent No.: US 11,128,335 B1
(45) Date of Patent: Sep. 21, 2021

(54) WRIST-WEARABLE SATELLITE COMMUNICATION DEVICE (71) Applicant: Lifeline, Genappe (BE)

(72) Inventors: Hadrien Dorchy, Genappe (BE);
Antonin Rovai, Genappe (BE);
Alejandro Socolovsky, Genappe (BE);
Jose Manuel Moreno, Genappe (BE);
Geert Van Overbeke, Genappe (BE)

(73) Assignee: Lifeline SRL, Genappe (BE)

( * ) Notice: Subject to any disclaimer, the term of this patent is extended or adjusted under 35 U.S.C. 154(b) by 0 days.

(21) Appl. No.: 17/127,333

(22) Filed: Dec. 18, 2020

(51) Int. Cl.
H04B 1/38 (2015.01)
H04B 1/3827 (2015.01)
G01S 19/35 (2010.01)
H01Q 1/27 (2006.01)
H01Q 1/48 (2006.01)

(52) U.S. Cl.
CPC .............. H04B 1/385 (2013.01); G01S 19/35 (2013.01); H01Q 1/273 (2013.01); H01Q 1/48 (2013.01)

(58) Field of Classification Search
CPC combination set(s) only.
See application file for complete search history.

(56) References Cited

U.S. PATENT DOCUMENTS

| 7,053,822 | B2 | 5/2006 | Rickerson, Jr. |
| 8,203,492 | B2 | 6/2012 | Anguera et al. |
| 9,379,443 | B2 | 6/2016 | Anguera Pros et al. |
| 9,978,252 | B2 | 5/2018 | See et al. |
| 2016/0308272 | A1* | 10/2016 | Standke .................. H01Q 13/10 |
| 2017/0187096 | A1* | 6/2017 | Hwang .................. H01Q 21/30 |
| 2019/0074586 | A1* | 3/2019 | Ruaro ....................... H01Q 1/44 |
| 2020/0015701 | A1* | 1/2020 | Wei .......................... H01Q 1/526 |
| 2020/0258374 | A1 | 8/2020 | Mehta et al. |
| 2020/0350684 | A1* | 11/2020 | Kenoun .................. H01Q 9/0414 |
| 2021/0075094 | A1* | 3/2021 | Da Costa Bras Lima ................... H04B 5/0037 |
| 2021/0096515 | A1* | 4/2021 | Ruaro ..................... H01Q 13/10 |

FOREIGN PATENT DOCUMENTS

WO    2010015364    2/2010

OTHER PUBLICATIONS

Andujar et al., "Ground Plane Boosters as a Compact Antenna Technology for Wireless Handheld Deviced", IEEE Transactions on Antennas and Propagation, vol. 59, No. 5, May 2011, 10 pages.

* cited by examiner

Primary Examiner — Junpeng Chen
(74) Attorney, Agent, or Firm — Hanley, Flight & Zimmerman, LLC (57) ABSTRACT

The disclosure relates to a wrist-wearable satellite communication device comprising a casing having an area smaller than 50 mm×50 mm, and a height smaller than 18 mm; a switch operable at a surface of said casing a wristband attached to said casing for fitting said device to a wrist of a wearer and an omnidirectional transmitter antenna, adapted to generate a message comprising the device identification code, location data received from a GNSS receiver and optionally physiological data of the user when the switch is operated.

9 Claims, 5 Drawing Sheets

WRIST-WEARABLE SATELLITE COMMUNICATION DEVICE

FIELD OF THE DISCLOSURE

The disclosure relates to a wrist-wearable satellite communication device allowing a person (whether or not in a situation of distress) out of reach of any cellular network, LPWAN or wireless LAN, to send a tailor-made message (whether or not containing an S.O.S), its GNSS coordinates and optionally physiological data (e.g. heartrate, oxygen level, etc.) to the recipient(s) of its choosing.

DESCRIPTION OF PRIOR ART

Document U.S. Pat. No. 7,053,822 discloses a wearable satellite tracker. In an embodiment, the wearable satellite tracker is a Personal Flotation Device or Life Vest with the wearable satellite tracker embedded in the life vest. Another embodiment for land use is a work belt with suspenders. All disclosed embodiments need an antenna mounted in the collar of the vest or on the upper part of the suspenders to give them the best view of the sky and need a separate battery pack making these devices unsuitable in for a wrist-worn use.

Document US20200258374 discloses systems and methods for sending emergency alerts comprising a wearable device and sensors that may trigger and send the emergency alerts via available communication devices. No provisions are made for using a satellite network as communication device.

Document U.S. Pat. No. 9,978,252 discloses a personal monitoring and emergency communications system including a mobile wrist worn apparatus. The apparatus broadcasts an emergency alarm signal through either a cell phone tower repeater station or the GPS satellite station. However, the GPS system is not designed for transmitting emergency messages from a device to a call center.

For transmitting a message to a low earth orbit satellite network, the device needs an antenna or a radiating structure. Such radiating structures are known e.g. from U.S. Pat. Nos. 8,203,492, 9,379,443 and WO2010015364. All these radiating structures are designed for use in a large hand-held device and comprise a ground plane matching the size of a large hand-held device but would not fit in a small wrist-wearable device. Document "A. Andújar, J. Anguera and C. Puente, "Ground Plane Boosters as a Compact Antenna Technology for Wireless Handheld Devices," in IEEE Transactions on Antennas and Propagation, vol. 59, no. 5, pp. 1668-1677, May 2011, doi: 10.1109/TAP.2011.2122299"' provides a multi-band wireless handheld device architecture.

Outdoor activities, such as trail running, hiking, snowshoeing, free ride skiing, surfing, kite-surfing, wind-surfing, paragliding, kayaking, rafting, camping, jet skiing, hunting, wildlife observing etc. are often performed in remote areas were no cellular network, LPWAN or wireless LAN is available, or, if available, not reliable enough. Whether alone or not, there is a need for a person (or at least one person of the group) to have a satellite communication device enabling the performer to send a message (with an SOS as the case may be) in a reliable and simple way. However, carrying a satellite phone or beacon is extremely cumbersome and not easy to use, notably because of its weight, format, and unidirectional antenna.

The task of designing an efficient small wrist-wearable satellite communication device is a complex task, because no antenna or other radiating system is known having a size fitting in a small wrist-wearable device and being omnidirectional.

SUMMARY OF THE DISCLOSURE

It is an object of the present disclosure to provide a satellite communication device which is wrist-wearable and comprising an antenna for the satellite transmission that is omnidirectional.

The disclosure is defined by the independent claims. The dependent claims define advantageous embodiments.

According to a first aspect of the disclosure, there is provided a wrist-wearable satellite communication device comprising a casing having an area smaller than 50 mm×50 mm, and a height smaller than 18 mm; a single switch operable at a surface of said casing; a wristband or bracelet attached to said casing for fitting said device to a wrist of a wearer. The casing encloses a printed circuit board (PCB) comprising a satellite transmitter module configured for transmitting messages to satellites of a low earth orbit satellite network in a signal having a transmission frequency in the range of 1400 MHz to 1800 MHz, said satellite transmitter module having an output impedance Z1, a Global Navigation Satellite System (GNSS) receiver 180 for receiving location data associated with the current location of the device; a controller comprising a device identification code and configured for causing the device to generate a message comprising the device identification code, the location data received from the GNSS receiver and optionally physiological data of the wearer when the switch is operated or depressed; and an omnidirectional transmitter radiating system for transmitting said message and comprising: a radiating structure comprising a ground plane area comprising a layer of conductive material, extending over a fraction of the area of the casing, the fraction being between 90% and 75% of the area; a conductive element having a first and a second terminal, extending over a clearance area, being a part of the area of the casing not occupied by the ground plane area; the second terminal of the conductive element being connected to a first point of the ground plane area; the conductive element and the ground plane area forming a circuit equivalent to a series RLC circuit having a resistance $R_a$, an inductance $L_a$ and a capacitance $C_a$, and an input impedance Z4, the conductive element, and the ground plane area being configured and positioned such that said transmission frequency may be at a frequency where the resonance peak of said series RLC circuit is below said peak value by less than 6 dB, a two-port impedance matching network having a first port connected for receiving said signal from said satellite transmitter module and having an input impedance Z2, and a second port, having an output impedance Z3, connected to the first terminal of the conductive element and to a second point of the ground plane area, the two-port impedance matching network being configured such that Z2=Z1* and Z3=Z4*, Z1* and Z3* being the complex conjugate of complex values Z1 and Z3, respectively.

Preferably, said two-port impedance matching network comprises an inductor L1 being connected in parallel with the first port and an inductor L2 connected in series between the first port and the second port.

Said inductor L1 may have an inductance between 1.6 nH and 2.0 nH, preferably 1.8 nH, and said inductor L2 may have an inductance between 5.8 nH and 7.8 nH, preferably 6.8 nH.

Preferably, said transmission frequency is comprised in the range of 1610 MHz to 1618.725 MHz.

Preferably, said conductive element is parallelepiped of 12 mm×2.4 mm×3 mm, the surface thereof being copper or other conductive material, the ground plane area being a disc having a diameter of 44 mm, comprising a layer of copper or other conductive material, a segment having a width of 8.5 mm being devoid of copper or other conductive material, the conductive element being provided in said segment, the longest side of it being disposed parallel to the limit of said segment, at a distance comprised between 2 mm and 3 mm thereof.

In an embodiment of the disclosure, said device may comprise a ground plane area extension, said ground plane area extension comprising a layer of conductive material, extending over a fraction of an area of the wristband and electrically connected to the ground plane area.

Said device may advantageously comprise a wireless communication channel adapted for communication with a data entry device, and in that said controller comprises means for receiving and storing a tailor-made message content, and to add said tailor-made message to said message.

According to a second aspect of the disclosure there is provided an Operations Control Network comprising one or more wrist-wearable satellite communication devices according to the first aspect of the disclosure, a low earth orbit satellite network comprising satellites adapted for receiving a signal having a transmission frequency in the range of 1400 MHz to 1800 MHz and transmitting a signal to a ground station of low earth orbit satellite network; a Global Navigation Satellite System (GNSS) network for enabling the devices to determine their location; an Operations Control Server adapted for receiving an emergency message emitted by one of said devices and transmitting said emergency message to a recipient.

According to a third aspect of the disclosure there is provided a method for designing wrist-wearable satellite communication device according the first aspect of the disclosure. The method comprises the steps of:

a) selecting the extent of the ground plane area of a PCB, the extent of said clearance area and the size and position of the conductive element;
b) producing a prototype according to the parameters determined in step a)
c) measuring a response of the radiating structure in a frequency range around said transmission frequency;
d) determining a dip response, being a frequency at which S11 response is minimal, in said range, and the S11 response at said transmission frequency;
e) if the response at said transmission frequency is more than 6 dB above said minimal value, repeating steps a) to d), the parameters determined in step a) being modified;
f) if the response at said transmission frequency is less than 6 dB above said minimal value, measuring the input impedance Z4 of the radiating structure, measuring the output impedance Z1 of the satellite transmitter module and adapting the parameters of the matching network in order that $Z1=Z2^*$, and $Z3=Z4^*$.

SHORT DESCRIPTION OF THE DRAWINGS

These and further aspects of the disclosure will be explained in greater detail by way of example and with reference to the accompanying drawings in which.

The drawings of the figures are neither drawn to scale nor proportioned. Generally, identical components are denoted by the same reference numerals in the figures.

DETAILED DESCRIPTION OF EMBODIMENTS OF THE DISCLOSURE

Figure 1A:
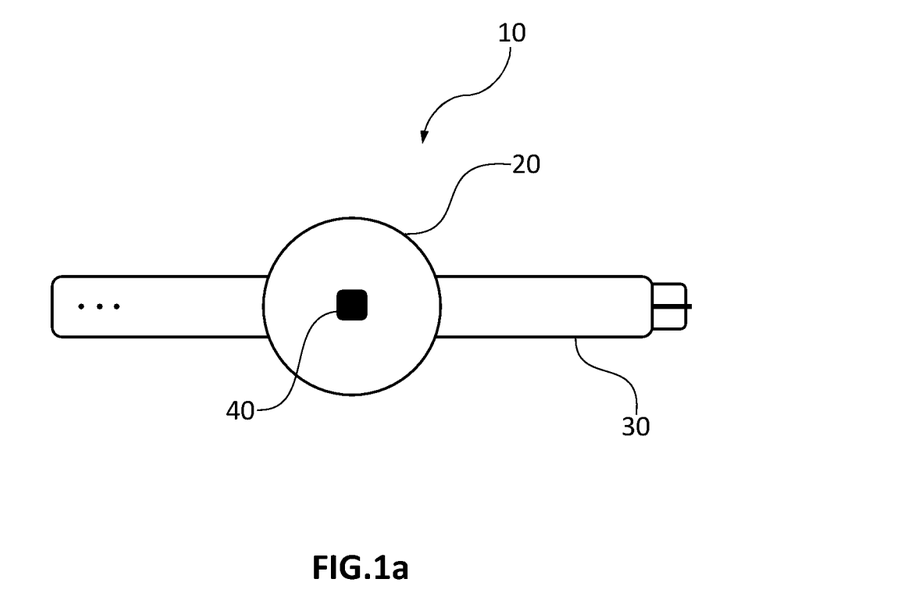
FIG. 1a represents schematically a top view of a wrist-wearable device according to the disclosure.

FIG. 1a represents schematically a top view of a wrist-wearable satellite communication device 10 according to the disclosure. The device has a shape and size similar to a conventional wrist-watch. The casing 20 may have a round shape as depicted, or square or rectangular shape, but fitting in a volume not larger than 50 mm×50 mm×18 mm. The device may therefore be worn without being cumbersome for the wearer. A switch 40 may be provided on the casing so that it can be operated by the wearer. The switch 40 may be located on a top surface, as depicted, or on a side surface of the casing 20. A wristband or bracelet 30 may be used for fastening the device 10 to a wrist of a wearer.

Figure 1B:
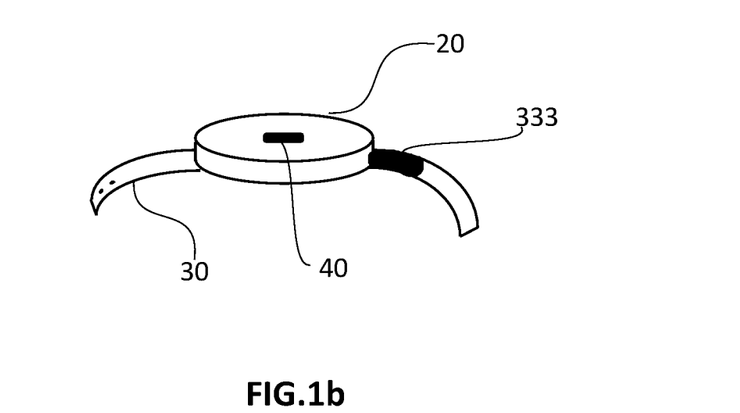
FIG. 1b is a perspective view of an embodiment of a wrist-wearable device according to the disclosure.

FIG. 1b is a perspective view of an embodiment of a wrist-wearable satellite communication device according to the disclosure, wherein the wristband 30 comprises a ground plane area extension 333. This ground plane area extension 333 comprises a layer of conductive material deposited on a part of the wristband 30. This part may be on one branch of the wristband, as depicted, or on both branches of the wristband. This ground plane area extension 333 may be electrically connected with a ground plane area located inside the casing 20. A preferred way of obtaining a device with a ground plane area extension 333 may be as follows: the wristband 30 and the casing 20 are integrally moulded as a single moulding, a piece of conductive material being embedded in a branch of the wristband and emerging inside the casing where it is connected with the ground plane area 330 on the PCB 100.

Figure 2:
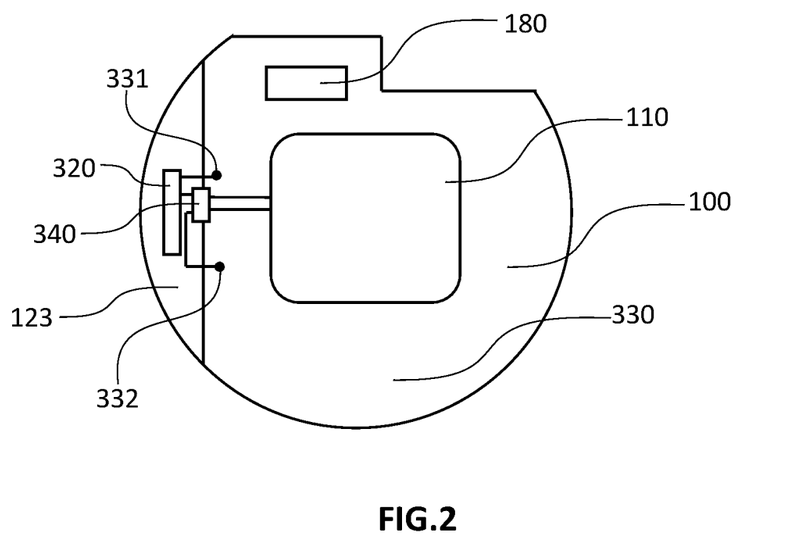
FIG. 2 represents schematically a top view of printed circuit board (PCB) comprised within the casing of the device.

FIG. 2 represents schematically a top view of printed circuit board (PCB) 100 comprised within the casing 20 of the device 10. In this example embodiment, the PCB 100 has a circular shape, having a diameter of 44 mm. A layer of conductive material, such as copper, e.g. a 0.1 mm copper layer, may be deposited on a fraction of the area of the PCB. A clearance area 123 may be a segment of the circle devoid of said layer of conductive material. The width of this clearance area, in the example embodiment, is 8.5 mm. Electronic components of the device are installed on the PCB 100, in a conventional manner. The layer of conductive material may only be removed where this is needed by the design of the circuit, e.g., where a wire lead of a component passes through the PCB for connecting to another layer of the PCB, the area around the hole is devoid of copper. Only the components relevant to the present disclosure are depicted on FIG. 2. The other components, well known in the art, are not represented. Component 180 may be a Global Navigation Satellite System (GNSS) receiver. Component 110 may be a satellite transmitter module. A convenient satellite transmitter module may be the Simplex Transmitter Unit STX3 provided by the company Globalstar. A conductive element 320 may be installed in the clearance area, at a distance 2.5 mm from the limit of the ground plane area. A two-port impedance matching network 340 may be installed between the conductive element 320 and the satellite transmitter module 110. This two-port impedance matching network 340 is described in more detail below.

Figure 3:
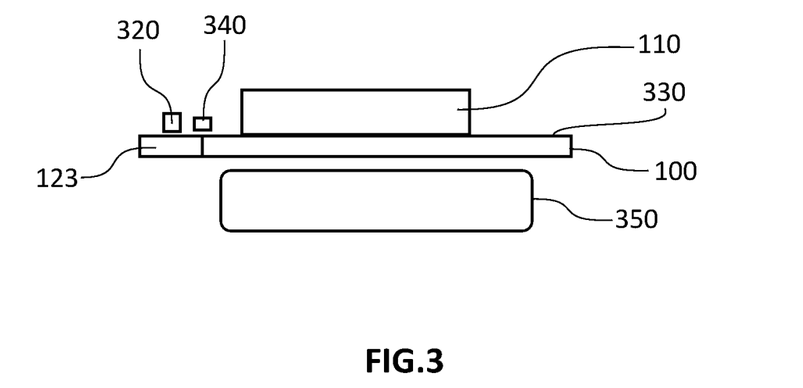
FIG. 3 represents schematically a side view of said PCB.

FIG. 3 represents schematically a side view of said PCB 100. Same components have same reference numbers. A battery 350 may be installed on a bottom face of the PCB 100. A Lithium Polymer (Lipo) battery having a capacity of at least 350 mAh and a voltage of 3.7 V was found convenient for the application.

Figure 4A:
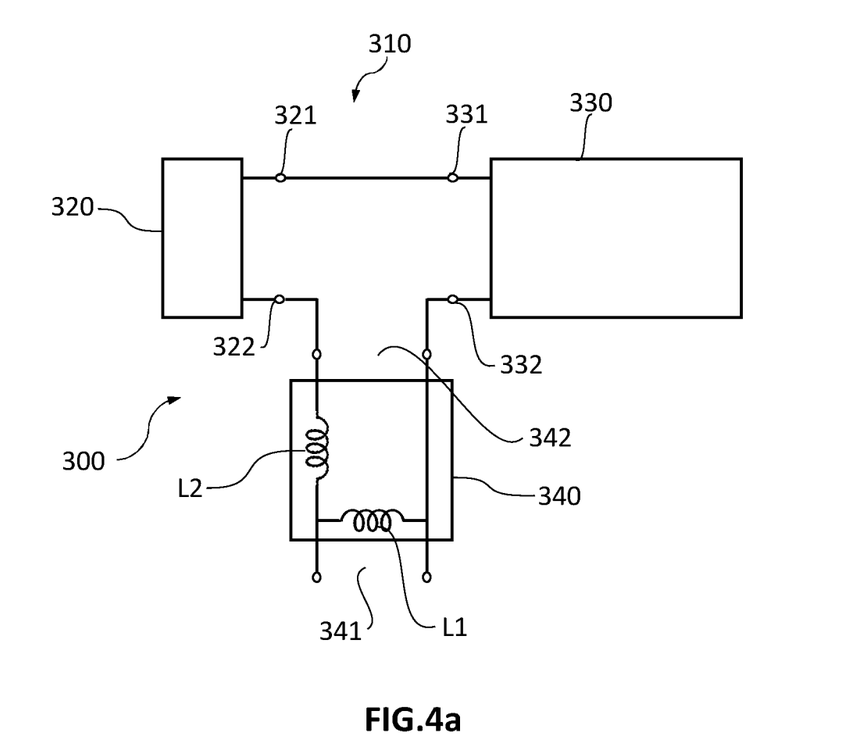
FIG. 4a is a circuit diagram of a radiating system for use in the device of the disclosure.

FIG. 4a is a circuit diagram of a radiating system 300 for use in the device 10 of the disclosure. The radiating system 300 comprises a radiation structure 310 and an impedance matching network 340. The radiating structure 310 comprises a conductive element 320 having a first terminal 321 and a second terminal 322. The conductive element may have a size such as 12 mm×2.4 mm×3 mm, or 5 mm×5 mm×5 mm. The conductive element 320 may comprise copper supported by expoxy material. In an example embodiment of the disclosure, the conductive element 320 was the Run mXTEND™ (FR01-S4-224) provided by the company Fractus Antennas S.L. A ground plane area 330 extends over a fraction of the area of the PCB or of the casing. A first point 331 of the ground plane area second point 332 of the ground plane are provided with connectors for connecting the ground plane area. The first terminal 321 of the conductive element 320 may be connected to the first point 331 of the ground plane area 330. The conductive element, and the ground plane area 330 connected as described, may be considered as a series RLC circuit between second terminal 322 of the conductive element and second point 332 of the ground plane area 330. The input impedance Z4 of said circuit may be determined by means well known in the art, such as a vector network analyzer (VNA). An impedance matching network 340 may be provided between the satellite transmitter module 110 and the radiating structure 310. The impedance matching network may be a two-port network, a first port 341 being an input port, having two terminals, a second port 342 being an output port, also having two terminals. The components are selected such that the input impedance Z2 of the first port 341 may be equal to the complex conjugate Z1* of the output impedance Z1 of the satellite transmitter module, and the output impedance Z3 of the second port 342 may be equal to the complex conjugate Z4* of the input impedance Z4 of the radiating stricture 310. In the example depicted, the impedance matching network comprise an inductor L1 connected in parallel with the first port 341 and an inductor L2 connected in series between the input port 341 and the output port 342. Other designs of the matching network may apply, depending on the other parameters of the circuit, such as the geometry of the radiating structure. In the conditions of the example embodiment, it was found that the values L1=1.8 nH and L2=6.8 nH provided an efficient matching network.

Figure 4B:
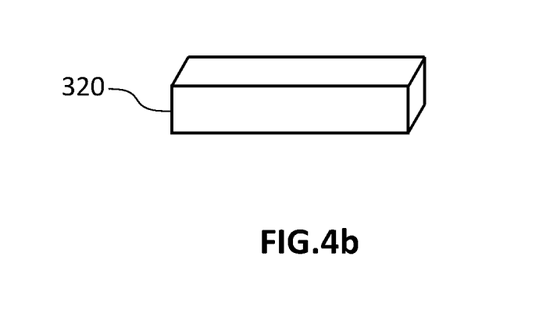
FIG. 4b is a schematic representation of a conductive element of an omnidirectional transmitter antenna for use in the device of the disclosure.

FIG. 4b is a schematic representation of a conductive element of an omnidirectional transmitter antenna for use in the device of the disclosure. In the example, this conductive element may be a RUN mXTEND™ (FR01-S4-224) provided by Fractus Antennas S.L. The size of this device may be 12.0 mm×3.0 mm×2.4 mm, and it may be made of glass epoxy substrate and of conductive material such as copper. The first 321 and the second 322 terminal are located at the bottom face of the conductive element, at the right and the left end of the element.

It has been found that by using the ground plane area 330, together with the conductive element 320 and the two-port matching network described above, an efficient communication with a Globalstar or other low earth orbit (LEO) satellites network may be achieved, and that the radiating system 300 radiates an omnidirectional radiation field.

Figure 5:
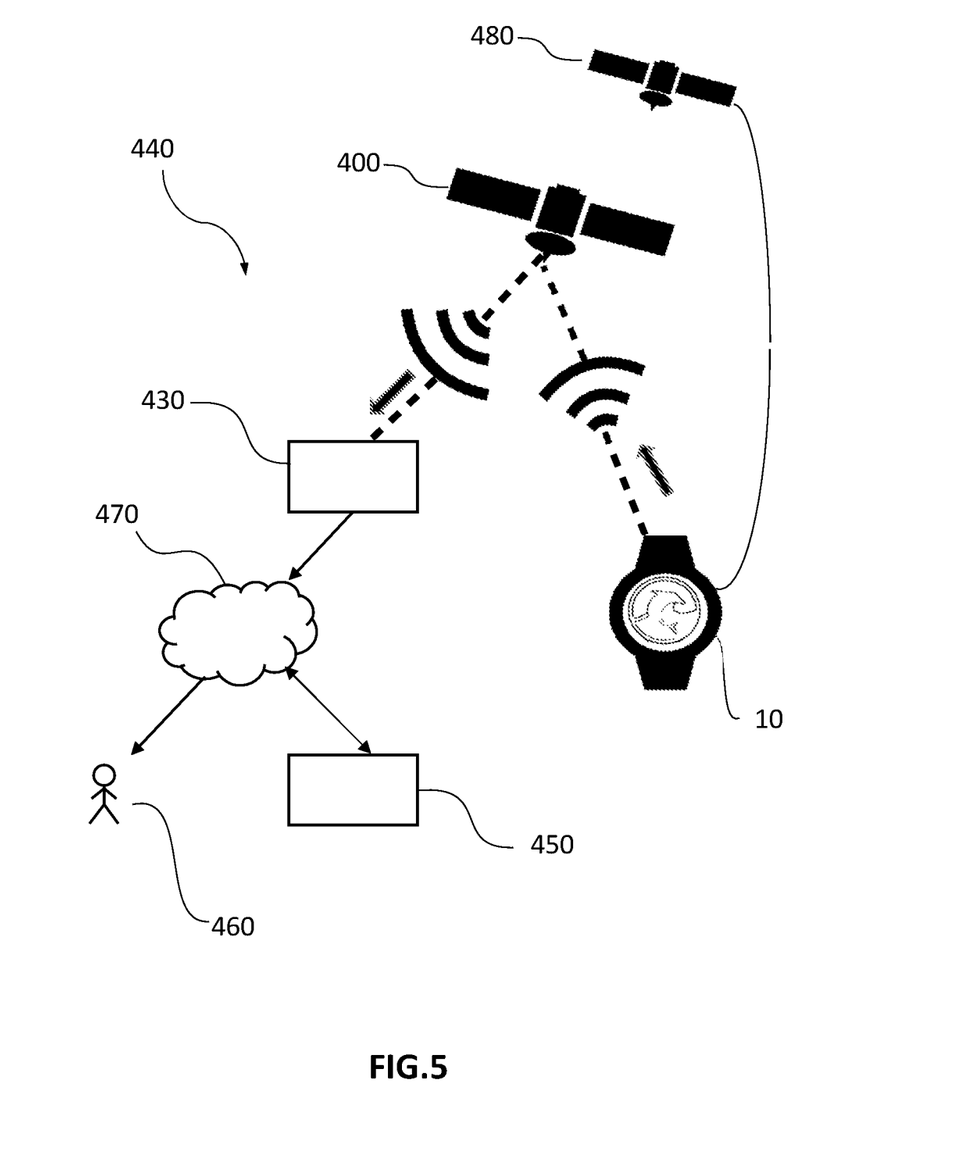
FIG. 5 is a representation of an Operations Control Network according to the disclosure.

FIG. 5 is a representation of an Operations Control Network 440, comprising one or more wrist-wearable satellite communication devices 10, one or more satellites 400 being part of a low earth orbit satellite network (e.g., Globalstar), one or more ground stations 430 of the low earth orbit satellite network, a communication network 470, an Operations Control Server 450. A satellite 480 of a Global Navigation Satellite System (GNSS) such as the GPS or Galileo or Glonass system, provides location data to the device 10. The communication network 470 may be the Internet. When the wearer of the device 10 wishes to send a satellite message (e.g. she/he may be in a situation of distress; she/he wishes to warn specific persons she/he reached a particular position, etc.), she/he depresses the switch 40 of the device 10. A message may be sent to the satellite 400. The message may comprise a unique device identification code, the current location data such as the GNSS coordinates and optionally physiological data. This message may be then forwarded to a ground station of low earth orbit satellite network 430, and further forwarded via the communication network 470 to an Operations Control Server 450. The Operations Control Server 450 may be configured to provide the selected message to a recipient 460.

Figure 6:
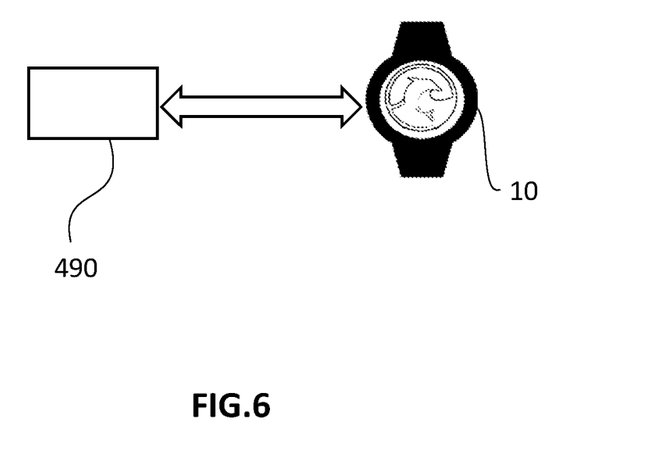
FIG. 6 is a representation of a wrist-wearable satellite communication device according to the disclosure in relation to a data entry device.

FIG. 6 is a representation of a wrist-wearable satellite communication device 10 according to the disclosure in relation to a data entry device 490. The data entry device 490 may be a mobile phone or a portable computer. The device 10 and the data entry device 490 may communicate through a wireless communication channel such as Bluetooth®, enabling the wearer of the device to configure a tailor-made message to be emitted. The configuration of the message does not require internet access and therefore may be performed while in remote locations. In addition, if the user has internet access while configuring its tailor-made message, she/he will have the option link the device identification code of her/his wrist-wearable satellite communication device with a tailor-made message stored in the Operations Control Server: in such case, the wrist-wearable satellite communication device will only send its device identification code and the location data, but not the full length of the message, thereby reducing the size of the message sent via satellite. The Operations Control Server will associate said device identification code with the encoded message and finally send the whole message to the final recipient. The user may even have the option to store a plurality of tailor-made messages in the Operations Control Server, and select the tailor-made message to be sent by operating the switch in an agreed way, e.g. a number of switch depression coding the number of the message to be sent, the It has been determined by the applicant that a design of a radiating structure conceived for applications in hand-held devices could be applied with success in a device having the size of a wrist-wearable device. For obtaining a such a design, the applicant performed the following steps:

A tentative design of the device is made, taking into account the size limits in order that the device be wrist-wearable. A PCB having a diameter of 44 mm was found convenient. The largest part of the area of the PCB may be occupied by a ground plane area 330. A clearance area 123 may be reserved for fitting the conductive element 320.

a prototype may be produced according to said tentative design;

one measures the response of the radiating structure in dependence of frequency in a range around the transmission frequency to be used for communication with the satellite network. Such measurements may be performed with a vector network analyzer (VNA). The response may be the parameter S11. A dip (minimum value) of S11 occurs at the resonance frequency of the radiation structure.

If said dip or resonance is far from the transmission frequency, meaning that the response parameter S11 at the transmission frequency more than 6 dB above the response parameter S11 at the frequency of the dip, the parameters of the tentative design are not satisfying. The tentative design must be adapted and reassessed.

If said dip or resonance is near the transmission frequency, the tentative design is satisfying. One measures the input impedance Z4 of the radiating structure, the output impedance Z1 of the satellite transmitter module one determines the parameters of the matching network in order that $Z1=Z2^*$, and $Z3=Z4^*$.

The Emergency Operations Control Network and the satellite communication device of the disclosure may be used by:

solo adventurers or small groups of adventurers whose sports take them to areas without network coverage or whose activities make carrying a cellphone or alternative device (e.g. Personal Beacon Locator) impractical and therefore the wrist-wearable satellite communication device may save lives in emergency situations;

people who enjoy more casual outdoor recreation activities and who need an increased sense of security;

Sports enthusiasts needing to secure a pickup point (paragliding, hot-air balloon, etc.);

elderly and child monitoring systems;

expatriate workers in dangerous areas and the military;

Non-invasive animal monitoring system.

The satellite communication device of the disclosure may be used for sending an emergency message by a person when in a situation of distress.

The invention claimed is:

1. A wrist-wearable satellite communication device comprising:
a casing having an area smaller than 50 mm×50 mm, and a height smaller than 18 mm,
a switch operable at a surface of said casing;
a wristband attached to said casing for fitting said device to a wrist of a wearer;
the casing enclosing a printed circuit board (PCB) comprising:
a satellite transmitter module configured for transmitting messages to satellites a low earth orbit satellite network in a signal having a transmission frequency in the range of 1400 MHz to 1800 MHz, said satellite transmitter module having an output impedance Z1,
a Global Navigation Satellite System (GNSS) receiver for receiving location data associated with the current location of the device;
a controller comprising a device identification code and configured for causing the device to generate a message comprising the device identification code and the location data received from the GNSS receiver and optionally physiological data of the wearer when the switch is operated; and
an omnidirectional transmitter radiating system for transmitting said message and comprising:
a radiating structure comprising
a ground plane area comprising a layer of conductive material, extending over a fraction of the area of the casing, the fraction being between 90% and 75% of the area;
a conductive element having a first and a second terminal, extending over a clearance area, being a part of the area of the casing not occupied by the ground plane area;
the second terminal of the conductive element being connected to a first point of the ground plane area the conductive element and the ground plane area forming a circuit equivalent to a series RLC circuit having a resistance $R_a$, an inductance $L_a$ and a capacitance $C_a$, and an input impedance Z4, the conductive element, and the ground plane area being configured and positioned such that said transmission frequency is at a frequency where the resonance peak of said series RLC circuit is below said peak value by less than 6 dB,
a two-port impedance matching network having a first port connected for receiving said signal from said satellite transmitter module and having an input impedance Z2, and a second port, having an output impedance Z3, connected to the first terminal of the conductive element and to a second point of the ground plane area, the two-port impedance matching network being configured such that $Z2=Z1^*$ and $Z3=Z4^*$, $Z1^*$ and $Z3^*$ being the complex conjugate of complex values Z1 and Z3, respectively.

2. The wrist-wearable satellite communication device according to claim 1, wherein said two-port impedance matching network comprises an inductor L1 being connected in parallel with the first port and an inductor L2 connected in series between the first port 341 and the second port 342.

3. The wrist-wearable satellite communication device according to claim 2, wherein said inductor L1 has an inductance between 1.6 nH and 2.0 nH, preferably 1.8 nH, said inductor L2 has an inductance between 5.8 nH and 7.8 nH, preferably 6.8 nH.

4. The wrist-wearable satellite communication device according to claim 1, wherein said transmission frequency is comprised in the range of 1610 MHz to 1618.725 MHz.

5. The wrist-wearable satellite communication device according to claim 1, wherein said conductive element is a parallelepiped of 12 mm×2.4 mm×3 mm, the surface thereof being copper or other conductive material, the ground plane area being a disc having a diameter of 44 mm, comprising a layer of copper or other conductive material, a segment having a width of 8.5 mm being devoid of copper or other conductive material, the conductive element being provided in said segment, the longest side of it being disposed parallel to the limit of said segment, at a distance comprised between 2 mm and 3 mm thereof.

6. The wrist-wearable satellite communication device according to claim 1, wherein said device comprises a ground plane area extension, said ground plane area extension comprising a layer of conductive material, extending over a fraction of an area of the wristband and electrically connected to the ground plane area.

7. The wrist-wearable satellite communication device according to claim 1, wherein said device comprises a wireless communication channel adapted for communication with a data entry device, and in that said controller comprises means for receiving and storing a tailor-made message content, and to add said tailor-made message to said message.

8. An Operations Control Network comprising:
   one or more wrist-wearable satellite communication devices according to claim 1;
   a low earth orbit satellite network comprising satellites adapted for receiving a signal having a transmission frequency in the range of 1400 MHz to 1800 MHz and transmitting a signal to a ground station of low earth orbit satellite network;
   a Global Navigation Satellite System (GNSS) network for enabling the devices to determine their location;
   an Operations Control Server adapted for receiving a message emitted by one of said devices and transmitting said message to a recipient.

9. A method for designing wrist-wearable satellite communication device according to claim 1 comprising the steps of:
   a) selecting the extent of the ground plane area of a PCB, the extent of said clearance area and the size and position of the conductive element;
   b) producing a prototype according to the parameters determined in step a) c) measuring a response of the radiating structure in a frequency range around said transmission frequency;
   d) determining a dip response, being a frequency at which $S11$ response is minimal, in said range, and the $S11$ response at said transmission frequency;
   e) if the response at said transmission frequency is more than 6 dB above said minimal value, repeating steps a) to d), the parameters determined in step a) being modified;
   f) if the response at said transmission frequency is less than 6 dB above said minimal value, measuring the input impedance $Z4$ of the radiating structure, measuring the output impedance $Z1$ of the satellite transmitter module and adapting the parameters of the matching network in order that $Z1=Z2^*$, and $Z3=Z4^*$.

* * * * *